UNITED STATES PATENT OFFICE.

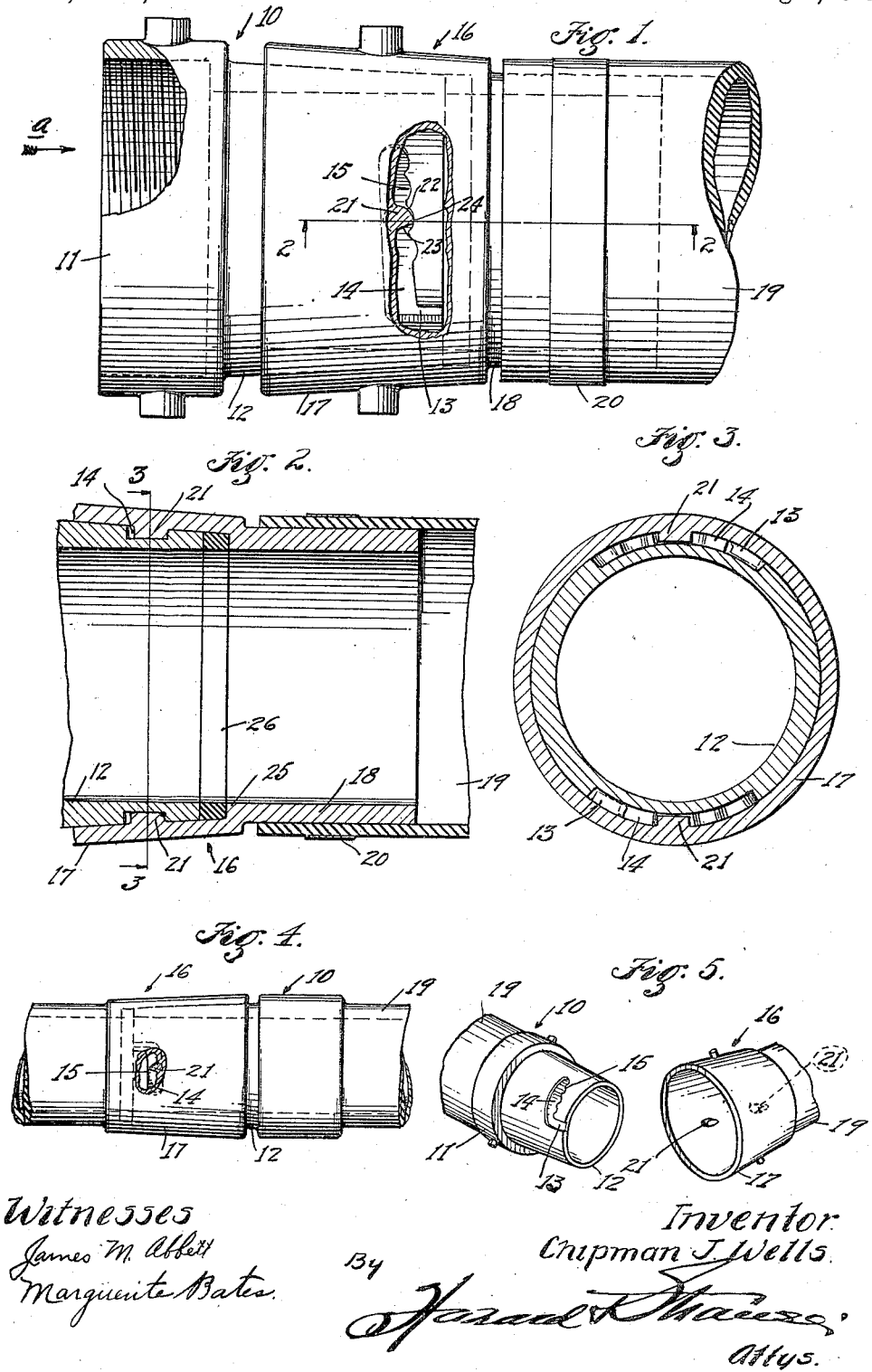

CHIPMAN J. WELLS, OF LONG BEACH, CALIFORNIA, ASSIGNOR OF ONE-THIRD TO SARAH L. DE LAND, OF LONG BEACH, CALIFORNIA.

HOSE-COUPLING.

1,193,446.

Specification of Letters Patent.

Patented Aug. 1, 1916.

Application filed November 30, 1914. Serial No. 874,785.

*To all whom it may concern:*

Be it known that I, CHIPMAN J. WELLS, a citizen of the United States, residing at Long Beach, in the county of Los Angeles, State of California, have invented new and useful Improvements in Hose-Couplings, of which the following is a specification.

This invention relates to a hose coupling.

It is the object of this invention to provide a coupling by means of which the terminal of a hose may be connected to a hydrant nozzle, or to any other hose terminals by means of a pair of telescoping members adapted to be connected together when in a telescoping position by a partial rotation of the members in relation to each other.

Another object is to provide a hose coupling comprising a pair of telescoping members with means whereby said members can be detachably connected together by a partial rotation of the members in relation to each other, so constructed and arranged that fluid pressure passing through the coupling and the hose attached thereto will operate to lock the coupling members against reverse rotation.

A further object is to provide a hose coupling locking means, including a bayonet slot formed on one coupling member, and a pin on the other coupling member adapted to be engaged by said slot, with means for temporarily locking the pin in the slot to normally hold the coupling members against rotation in relation to each other.

The invention is illustrated in the accompanying drawings, in which:

Figure 1 is a view of the coupling in side elevation, with parts broken away. Fig. 2 is a view in vertical section, as seen on the line 2—2 of Fig. 1 in the direction indicated by the arrows. Fig. 3 is a view in transverse section on the line 3—3 of Fig. 2, as seen in the direction indicated by the arrows. Fig. 4 is a view in side elevation illustrating a modified form of the invention, with parts broken away. Fig. 5 is a view in perspective illustrating the separable members of the coupling in their detached position.

More specifically, 10 indicates the male member of the coupling which is formed with an internally threaded sleeve portion 11, adapted to be attached to a hydrant, nozzle, or hose section, and which sleeve carries an externally tapered tubular portion 12. The tapered tubular portion 12 is formed with a pair of longitudinally extending grooves 13, arranged on the diametrically opposite sides thereof, which grooves open at their outer ends at the end of the portion 12 and connect at their inner ends with oppositely extending channels 14, arranged circumferentially of the member 12 and extending at a slight rearward inclination. The outer walls of the channels 14 are preferably formed with a series of serrations 15, as particularly shown in Figs. 1, 3 and 5.

The female member 16 of the coupling consists of a sleeve 17, having a tapered inner wall adapted to receive the tubular portion 12 of the male member 10, as particularly shown in Fig. 2; the sleeve 17 being formed with a cylindrical extension 18 adapted to be introduced into the terminal of a hose 19 and secured thereto by a hose clamp 20 of any suitable construction.

Mounted on the inner wall of the sleeve 17 and extending on the diametrically opposite sides thereof, is a pair of studs 21 adapted to extend into the channels 14. The studs 21 are formed with grooved or arcuate faces 22 on the sides thereof extending toward the ends of the channels 14 and are formed with substantially flat faces 23 on the sides opposite the arcuate faces 22, which intersect the latter to form a sharp edge 24 extending longitudinally of the stud.

An annular shoulder 25 is formed in the member 16, against which a resilient gasket 26 is adapted to seat, the gasket 26 being provided for the purpose of forming a tight joint between the end of the portion 12 of the male member 10 when the coupling is assembled, as shown in Fig. 2.

In the operation of the invention, to connect the coupling members together the sleeve 17 is placed over the portion 12 with the studs 21 extending into the circumferential channels 14; the studs 21 being moved into engagement with the channels 14 through the open ended grooves 13. The members 10 and 16 are then rotated in opposite directions in relation to each other to advance the studs 21 along the serrated, inclined walls of the channels 14. The studs 21, in traveling along the inclined walls of the channels 14, cause the members 10 and 16 to advance toward each other, with the end of the portion 12 of the member 10 abutting against the gasket 26, which by reason of its resiliency will yield and permit the tapered wall of the member 12 being forced into tight frictional engagement with the inner wall of the member 16. The resilient gasket 26 will then exert a longitudinal pressure on the members 10 and 16, and cause the studs 21 on the sleeve 17 to be moved into engagement with the notches or serrations 15 on the outer walls of the channels 14, as particularly shown in Fig. 1. On passing water under pressure through the coupling in the direction indicated by the arrow $a$ in Fig. 1, the pressure of the fluid on the hose 19 will serve to exert a pull on the coupling member 16, thereby holding the studs 21 in engagement with the notches or serrations 15.

The arcuate faces 22 of the studs 21 permit the latter being readily advanced over the notches or serrations 15, in moving the parts to their connected position. When the parts are connected, as shown in Fig. 1, the edges 24 of the studs 21 will engage the notches 15 in such manner as to temporarily lock the members 10 and 16 against rotation in relation to each other.

Where the invention is applied to small couplings such as are employed in garden hose, the use of the serrations 15 may be dispensed with, in which event the sharp edges of the studs 21 will engage the outer wall of the channels 14, as particularly shown in Fig. 4; the tendency of the edge 24 to gouge into the wall of the channel 14 on rotating the members 10 and 16 in reverse directions will serve to temporarily lock the members against disconnection.

To release the coupling members it will be necessary to force the members toward each other in opposition to the resilient gasket 26 a sufficient distance to disengage the edges 24 of the studs 21 from the serrations 15 or the wall of the channels 14. The members 10 and 16 may then be rotated in reverse directions in relation to each other to prevent the studs 31 being withdrawn through the open-ended slots 13.

What I claim is:

A hose coupling, comprising a conoidal member having an inclined channel extending peripherally thereof, said channel being formed with a series of serrations on its outer wall, a sleeve adapted to receive the conoidal member, and studs on the inner wall of said sleeve having a face of relatively great longitudinal slope on the side thereof in the direction of advancement of the stud in coupling the cylindrical member and sleeve and a face of relatively small slope on the opposite side thereof, said stud disposed to extend into the channel and to be engaged by the serrated wall thereof.

In witness that I claim the foregoing I have hereunto subscribed my name this 10th day of November, 1914.

CHIPMAN J. WELLS.

Witnesses:
HENRIETTA E. WORKMAN,
MARGUERITE BATES.

Copies of this patent may be obtained for five cents each, by addressing the "Commissioner of Patents Washington, D. C."